(12) United States Patent
Matsumura

(10) Patent No.: US 11,262,723 B2
(45) Date of Patent: Mar. 1, 2022

(54) MACHINING PATH GENERATION DEVICE AND NUMERICAL CONTROL DEVICE

(71) Applicant: FANUC CORPORATION, Yamanashi (JP)

(72) Inventor: Hiroshi Matsumura, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 53 days.

(21) Appl. No.: 16/534,360

(22) Filed: Aug. 7, 2019

(65) Prior Publication Data

US 2020/0050168 A1 Feb. 13, 2020

(30) Foreign Application Priority Data

Aug. 10, 2018 (JP) .............................. JP2018-151560

(51) Int. Cl.
*G05B 19/19* (2006.01)

(52) U.S. Cl.
CPC .... *G05B 19/19* (2013.01); *G05B 2219/35097* (2013.01); *G05B 2219/45044* (2013.01)

(58) Field of Classification Search
CPC .......... G05B 19/19; G05B 2219/35097; G05B 2219/45044; G05B 19/4093; G05B 19/25; G05B 19/4155; Y02P 90/02; B23Q 15/013
See application file for complete search history.

(56) References Cited

U.S. PATENT DOCUMENTS

2011/0190925 A1\* 8/2011 Fujishima .......... G05B 19/4155
700/173

FOREIGN PATENT DOCUMENTS

JP 2014-126901 A 7/2014

\* cited by examiner

*Primary Examiner* — Thomas C Lee
*Assistant Examiner* — Charles Cai
(74) *Attorney, Agent, or Firm* — Studebaker & Brackett PC

(57) ABSTRACT

A machining path generation device which generates a cutting path upon rough cutting a workpiece by a turning process, and a numerical control device equipped therewith, are provided to shorten the path during rough cutting, and thus reliably shorten the cycle time. The device includes a storage unit which stores information of a cutting start point and a cutting end point of rough cutting; a finishing allowance permitted range setting unit which sets a finishing allowance permitted range for a finishing step; and a cutting path generation unit which generates a cutting path connecting the cutting start point and the cutting end point in a cross-sectional view in a direction along a rotation axis line of the workpiece, the cutting path arranged within the finishing allowance permitted range, and shorter than a path following along a shape line of a product form.

6 Claims, 16 Drawing Sheets

FIG .16
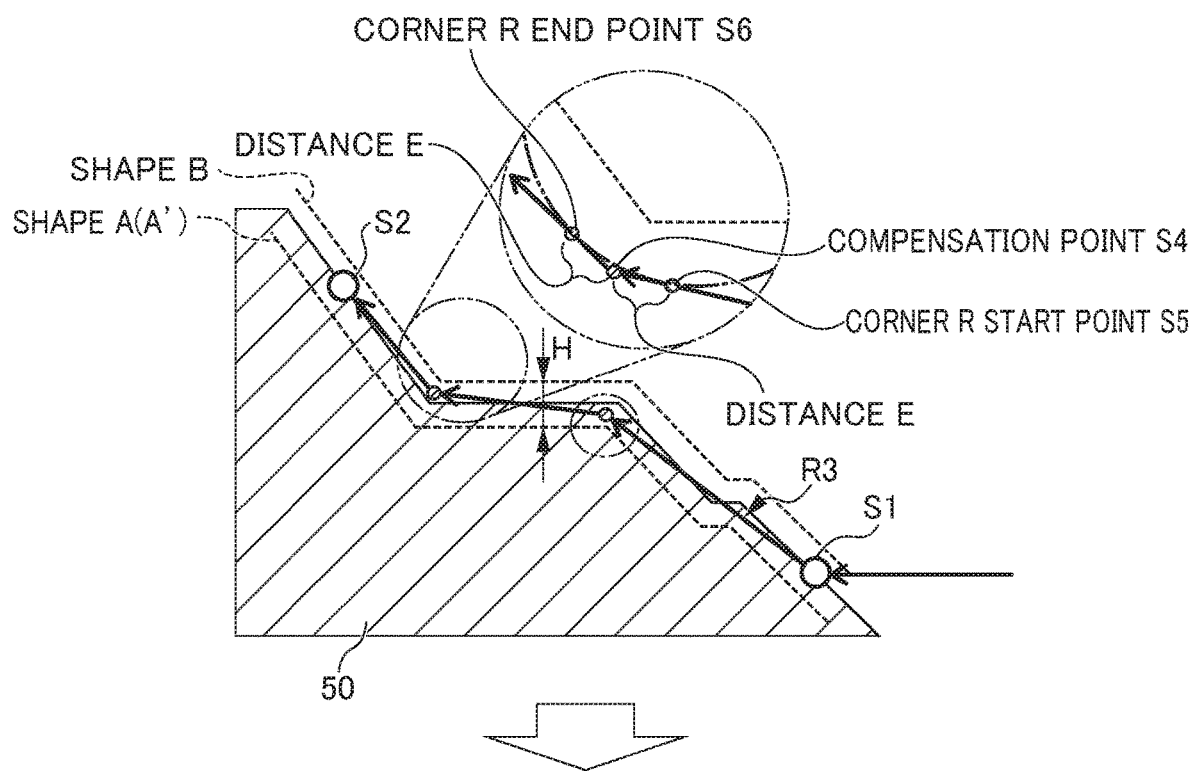
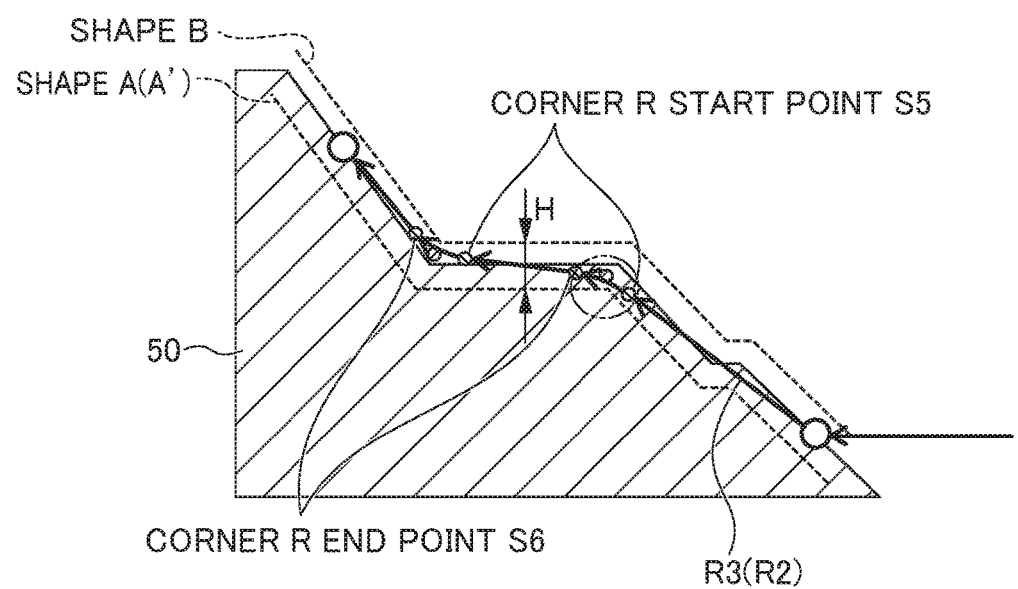

MACHINING PATH GENERATION DEVICE AND NUMERICAL CONTROL DEVICE

This application is based on and claims the benefit of priority from Japanese Patent Application No. 2018-151560, filed on 10 Aug. 2018, the content of which is incorporated herein by reference.

BACKGROUND OF THE INVENTION

Field of the Invention

The present invention relates to a machining path generation device which generates a cutting path upon rough cutting a workpiece by a turning process, and a numerical control device including this.

Related Art

Conventionally, upon turning processing a workpiece 50 by a numerical controlled machine tool such as an NC device (NC: Numerical Control, numerical control device), after rough cutting the workpiece 50 so as to become a desired shape, cutting depth and finishing allowance, according to the commands of computer numerical control (CNC), finish processing is performed. It should be noted that there are also cases of performing semi-finishing processing while moving from rough cutting to finish processing.

In addition, by programming the finished shape, cutting depth, finishing allowance, etc., the CNC (numerical control machine tool) automatically determines the tool path/cutting path R1 of rough cutting in accordance with fixed rule, and the turning cycle for rough cutting is prepared (refer to FIG. 17). It is thereby possible to simply program an onerous turning operation.

On the other hand, Patent Document 1 discloses a CAM apparatus which automatically generates at least one machining region on the product form having a curved surface shape, and automatically sets the machining region combination and tool axis angle such that the overall machining time becomes shorter.

In Patent Document 1, using the coordinate information of the product form and material shape, creates a pattern of a four-cornered shape of a machining region, and creates the machining region of a three-cornered shape in the irregular surface of the product. In addition, in the machining region created by the difference calculation between the material shape and the removed shape calculated by difference calculation of the product form, the tool axis angle is set so that the tool does not interfere, and makes the largest surface. Furthermore, the tool axis is set so as to satisfy the remainder criterion in other regions, and the tool pass length (cutting path length) becomes the shortest.

Then, the machining time is calculated from the length of the tool path and the machining conditions of the tool, and a combination of machining regions having the shortest machining time is obtained among the combinations of machining regions decided by the material form and product form. It thereby becomes possible to automatically generate the machining region in the product form having a curved shape, and automatically set the machining region combination and tool axis angle such that the total machining time becomes short.

Patent Document 1: Japanese Unexamined Patent Application, Publication No. 2014-126901

SUMMARY OF THE INVENTION

Herein, upon rough cutting the workpiece 50 by a turning process, generally, a program of a rough cutting cycle is created so as to perform an up-cutting operation of the rough cutting cycle, or in-cutting operation in the case of there being a pocket shape, along a finished shape. At this time, since it is necessary to create a program of the rough cutting cycle for every block according to the in-cutting amount ($\Delta d$), it takes greater time and effort in the creation of the program as the shape becomes more complicated.

In addition, conventionally, if the machinable region of the finishing allowance portion (U, W) gives consideration to the generation of the cutting path R1 of the rough cutting cycle, the cutting path R1 of rough cutting is set so as to run along the finished shape, and so that a predetermined finishing allowance is maintained. For this reason, the cutting path R1 of rough cutting may become long in reality, and this becomes a main cause for an increase in cycle time and thus decline in yield rate.

In addition, in a case such that some incomplete cutting (U', W') is permitted, it is possible to further shorten the path R1 within the range of the region combining with the finishing allowance (U+U', W+W'); however, setting the cutting path R1 of rough cutting is not carried out within such a range of the region combined with the finishing allowance (U+U', W+W').

Incidentally, the above-mentioned Patent Document 1 configures so as to calculate the machining time from the length of the tool path (cutting path R) and the machining conditions of the tool, and among the combinations of machining regions decided by the material form and product form, obtains the combination of the machining regions having the shortest machining time, and thus the total machining time becomes shorter relative to the product form having a curved shape.

However, this Patent Document 1 targets a product having a curved shape, and obtains the shortest path by making the path (tool path) of rough cutting linear so as to simplify the rough cutting shape relative to the finished shape. The path during rough cutting thereby becomes shorter by setting one line obtained from the finished shape as the shortest path; however, cases of large incomplete cutting in the finished form, and incomplete cutting being produced that is not permittable during finishing processing also arise, and as a result thereof, achieving shortening of the machining time just cannot be done because a separate process of intermediate finishing becomes required, and conversely, there is concern over the machining time increasing.

The present invention takes into account the above-mentioned situation, and has an object of providing a machining path generation device and a numerical control device equipped with this which can shorten the path during rough cutting of a workpiece, and reliably shorten the cycle time.

The present inventors have found a means for shortening (optimizing) the cutting path during rough cutting of a workpiece, thereby arriving at completion of the present invention.

A machining path generation device according to a first aspect of the present invention is a machining path generation device which generates a cutting path upon rough cutting a workpiece by a turning process, the device including: a storage unit which stores information of a cutting start point and a cutting end point of rough cutting of a workpiece; a finishing allowance permitted range setting unit which sets a finishing allowance permitted range which can be permitted in a finishing step of post process; and a cutting path generation unit which generates a cutting path connecting the cutting start point and the cutting end point in a cross-sectional view in a direction along a rotation axis line of the workpiece, so as to be arranged within the finishing allowance permitted range, and connect the cutting start point and the cutting end point to be shorter than a path following along a shape line of a product form.

According to a second aspect of the present invention, the machining path generation device as described in the first aspect may further include a provisional path generation unit which obtains a provisional path of a line connecting the cutting start point and the cutting end point, in which the cutting path generation unit, in a case of the provisional path departs from the finishing allowance permitted range, may generate a cutting path by compensating the provisional path of a region departing from the finishing allowance permitted range so as to be arranged within the finishing allowance permitted range.

According to a third aspect of the present invention, in the machining path generation device as described in the second aspect, the cutting path generation unit may include: a path interference determination part which confirms whether or not the provisional path interferes with each of the shape line of product form, and a shape line of a shape adding the finishing allowance and the incomplete cutting permitted amount, in a cross-sectional view in a direct along the rotation axis line of the workplace, and a cutting path determination part which establishes the provisional path as the cutting path, in a case of the path interference determination section determining as not interfering; the cutting path determination part may include: a relay point setting section which, in a case of the path interference determination part determining as interfering, obtains a point farthest from the provisional path in the interfering region, and establishes this point as a relay point, and a provisional path compensation section which generates a new provisional path connecting the cutting start point and the cutting end point through the relay point; and the cutting path determination part may repeat setting of the relay point until the provisional path falls within the finishing allowance permitted range, and generation of the new provisional path, and establish a provisional path falling within the finishing allowance permitted range as a cutting path.

According to a fourth aspect of the present invention, the machining path generation device as described in the third aspect may further include a curving compensation unit for generating a cutting path which establishes into a circular arc shape and smoothly connects a portion of the relay point.

A numerical control device according to a fifth aspect of the present invention includes the machining path generation device as described in any one of the first to fourth aspects.

In the invention according to the first to fifth aspects, it is possible to set so as to make the cutting path of rough cutting machining as short as possible, within a finishing allowance permitted range which can be permitted in the finish machining in a subsequent step. It is thereby possible to mark the cutting path shorter than conventional method which sets the cutting path along the shape of the finish machining, and thereby becomes possible to shorten the cycle time. In other words, it becomes possible to optimize the in-cutting/up-cutting path of a rough cutting cycle of a machine tool.

According to the present invention, it is possible to shorten the cutting path upon rough cutting of the workpiece, whereby shortening of the cycle time becomes possible.

In addition, in the case of turning processing a product having a plurality of corners, it is possible to reduce the number of corners upon rough cutting. It is thereby possible to reduce the locations at which performing acceleration/deceleration, and further shortening of the cycle time becomes attainable.

BRIEF DESCRIPTION OF THE DRAWINGS

FIG. 16 is a cross-sectional view used in explanation of a method of curve compensating a cutting path by the machining path generation device according to the embodiment of the present invention;

DETAILED DESCRIPTION OF THE INVENTION

Hereinafter, a machining path generation device according to an embodiment of the present invention and a numerical control device equipped with this (hereinafter referred to as NC device) will be explained referencing FIGS. 1 to 16.

Herein, the present embodiment is related to a machining path generation device which, upon performing a turning process using a numerical control device such as the NC device, shortens the cutting path of a rough cutting cycle of a workpiece, and enables the shortening of the cycle time of machining. In addition, it relates to an NC device for a lathe equipped with this machining path generation device.

Figure 1:
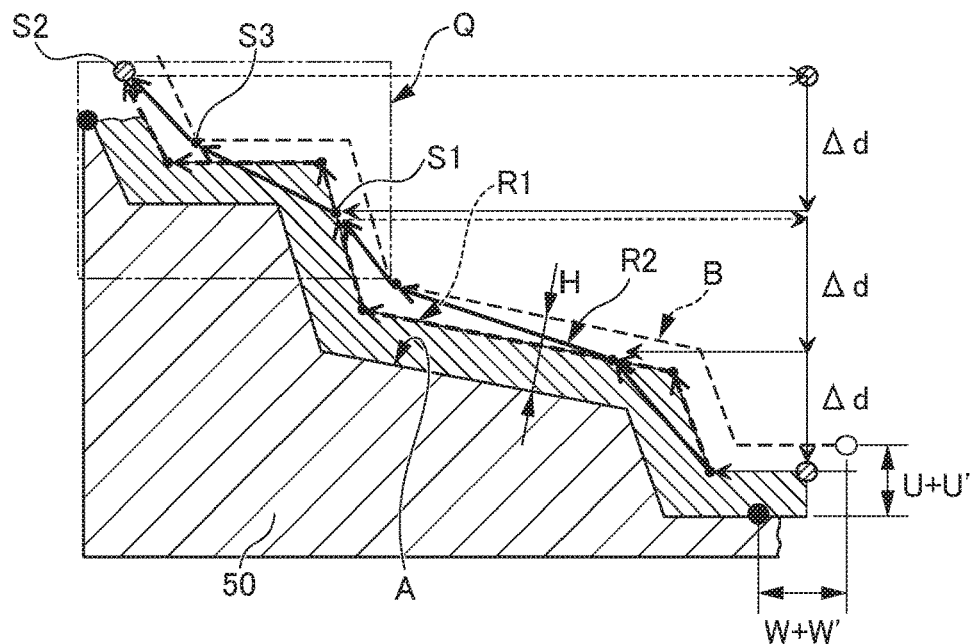
FIG. 1 is a cross-sectional view showing a cutting path upon rough cutting which was set by a machining path generation device (and numerical control device including this) according to an embodiment of the present invention.
Figure 2:
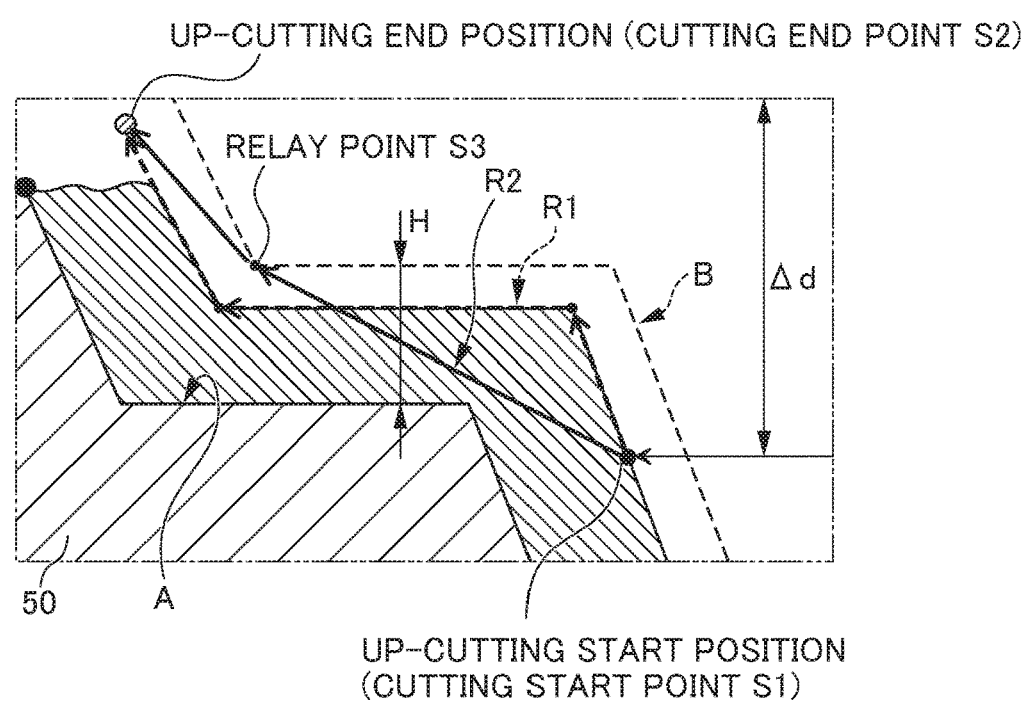
FIG. 2 is an enlarged view of a symbol Q part in FIG. 1.

With the machining path generation device and NC device of the present embodiment, during rough cutting of a workpiece 50 as shown in FIGS. 1 and 2, contrary to a conventional method of performing rough cutting running along the shape of the finishing processing (cutting path R1), it sets the cutting start point of rough cutting (up-cutting start point, in-cutting start point) S1, and cutting end point (up-cutting end point, in-cutting end point) S2, and sets a cutting path R2 from this cutting start point S1 that arrives at the cutting end point S2 to within a range (finishing allowance permitted range) H leaving a finishing allowance which can be permitted for appropriately performing finishing processing.

In other words, by configuring so as to place the cutting path R2 within the finishing allowance permitted range H, it becomes possible to set at least part of the cutting path R2 so as not to run along the product form (form without finishing allowance: form A). It thereby becomes possible to shorten the cutting path R2 during rough cutting compared to conventional, without leaving excessive finishing allowance which cannot be permitted.

Figure 3:
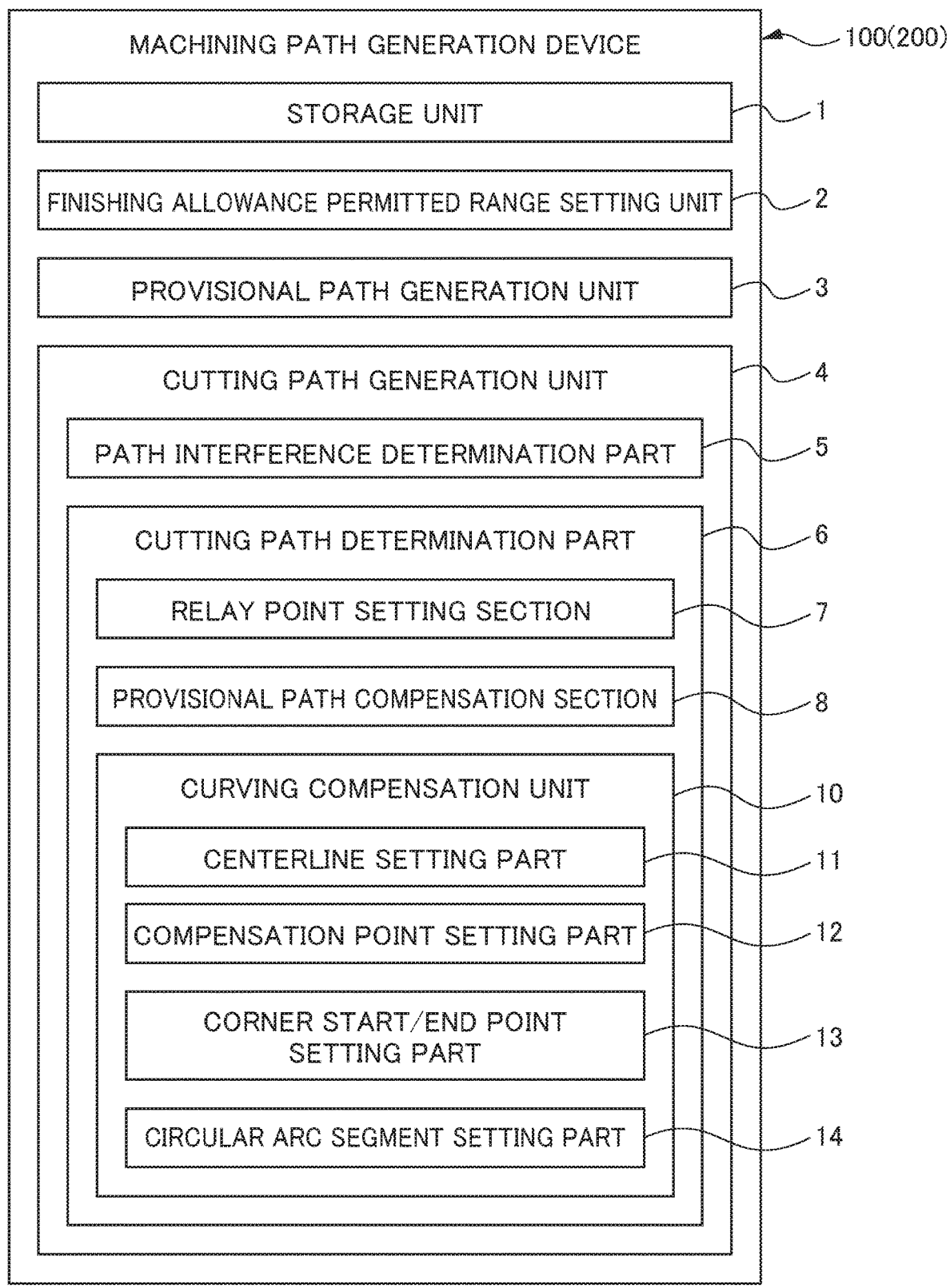
FIG. 3 is a block diagram showing a machining path generation device (and numerical control device including this) according to an embodiment of the present invention.
Figure 4:
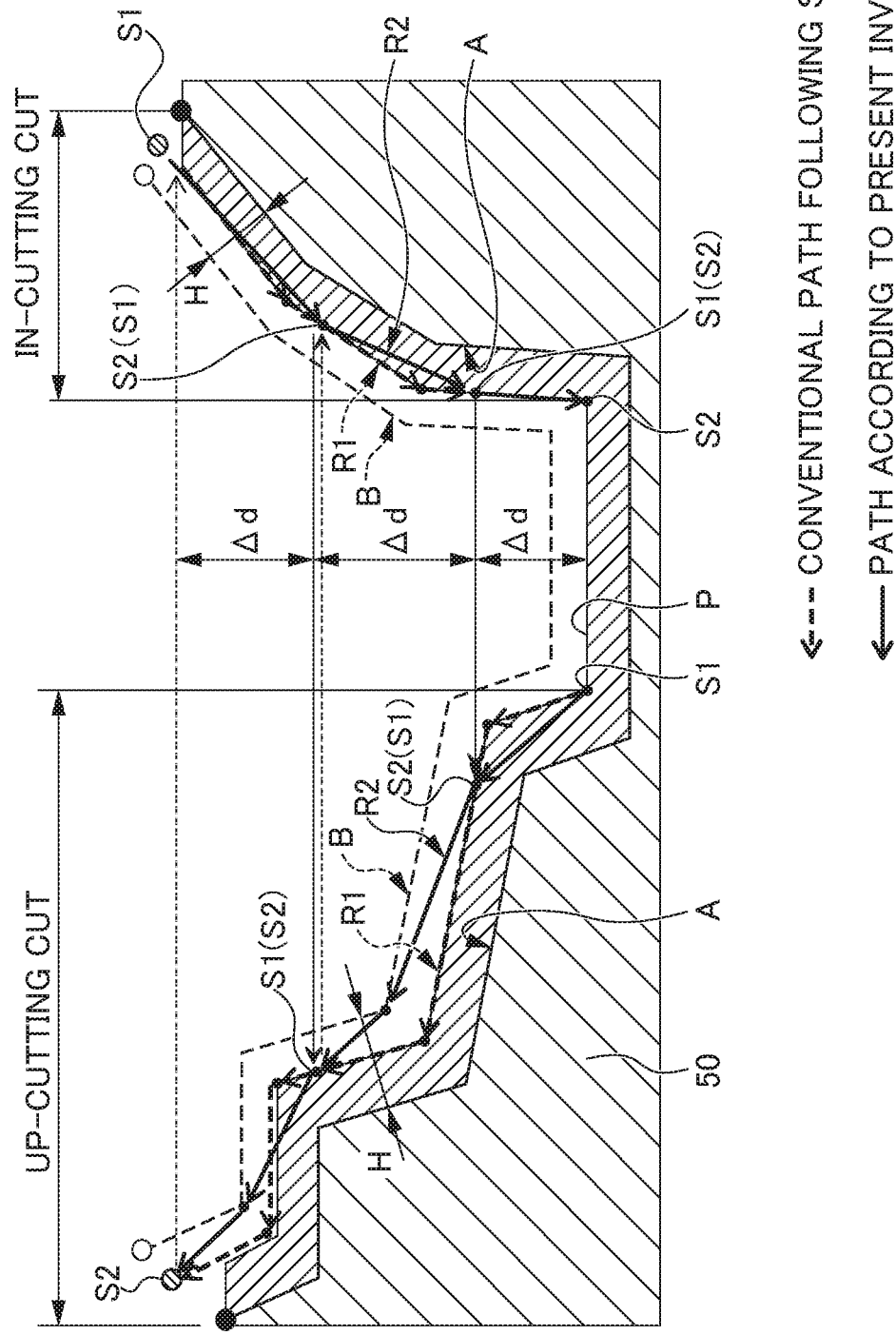
FIG. 4 is a cross-sectional view showing a cutting path during rough cutting of a pocket shape which was set by the machining path generation device (and numerical control device including this) according to the embodiment of the present invention.

More specifically, the machining path generation device 100 and NC device 200 of the present embodiment, as shown in FIG. 3 (FIG. 1 and FIG. 2) include: a storage unit 1 which stores information of the cutting start point S1 and cutting end point S2 of each block of rough cutting of the workpiece 50; a finishing allowance permitted range unit 2 which determines the finishing allowance permitted range H which can be permitted for appropriately performing finishing processing in a following step; a provisional-path generation unit 3 which obtains a provisional path R3 (details described later: not shown) connecting the cutting start point S1 and cutting end point S2; and a cutting path generation unit 4 which, in a case of the provisional path R3 departing from a finishing allowance permitted range H, generates a cutting path (main path) R2 by compensating so that the provisional path R3 in the region in which this provisional path R3 departs from the finishing allowance permitted range H is arranged within the finishing allowance permitted range H.

In addition, the cutting path generation unit 4 includes: a path interference determination part 5 which confirms whether the provisional path R3 interferes with a shape line (ridge line) of a product form A, and the shape line (ridge line) of a shape B made by adding the finishing allowance and incomplete cutting tolerance, respectively, in a cross-sectional view in a direction running along the rotational axis line of the workpiece 50 during a turning process; and a cutting path determination part 6 which, in a case of determining as not interfering by way of the path interference determination part 5, establishes the provisional path R3 obtained by the provisional-path generation unit 3 as the cutting path R3 during rough cutting.

Furthermore, the cutting path determination part 6 includes: a relay point setting section 7 which, in a case of determining as interfering by the path interference determination part 5, obtains the farthest point from the provisional path R3 in a interfering region, and establishes this as a relay point S3; and a provisional path compensation section 8 which connects a cutting start point S1 and cutting end point S2 passing through the relay point S3 to generate a new provisional path R3. Then, in the case of this new provisional path R3 fitting into the finishing allowance permitted range H, the cutting path determination part 6 establishes the new provisional path R3 as a cutting path R2 of a main path.

Hereinafter, a method of performing rough cutting of the workpiece 50 using the machining path generation device 100 and NC device 200 of the present embodiment consisting of the above-mentioned configuration will be explained. Herein, although an explanation is made of performing up-cutting on the workpiece 50 without pocket shape machining in a turning process of the workpiece 50, in the undercut cutting of a pocket shape or the like shown in FIG. 4, a cutting operation may in summary be performed by considering "up-cutting" related to the following up-cut cutting as "undercutting (in-cutting)".

Figure 5:
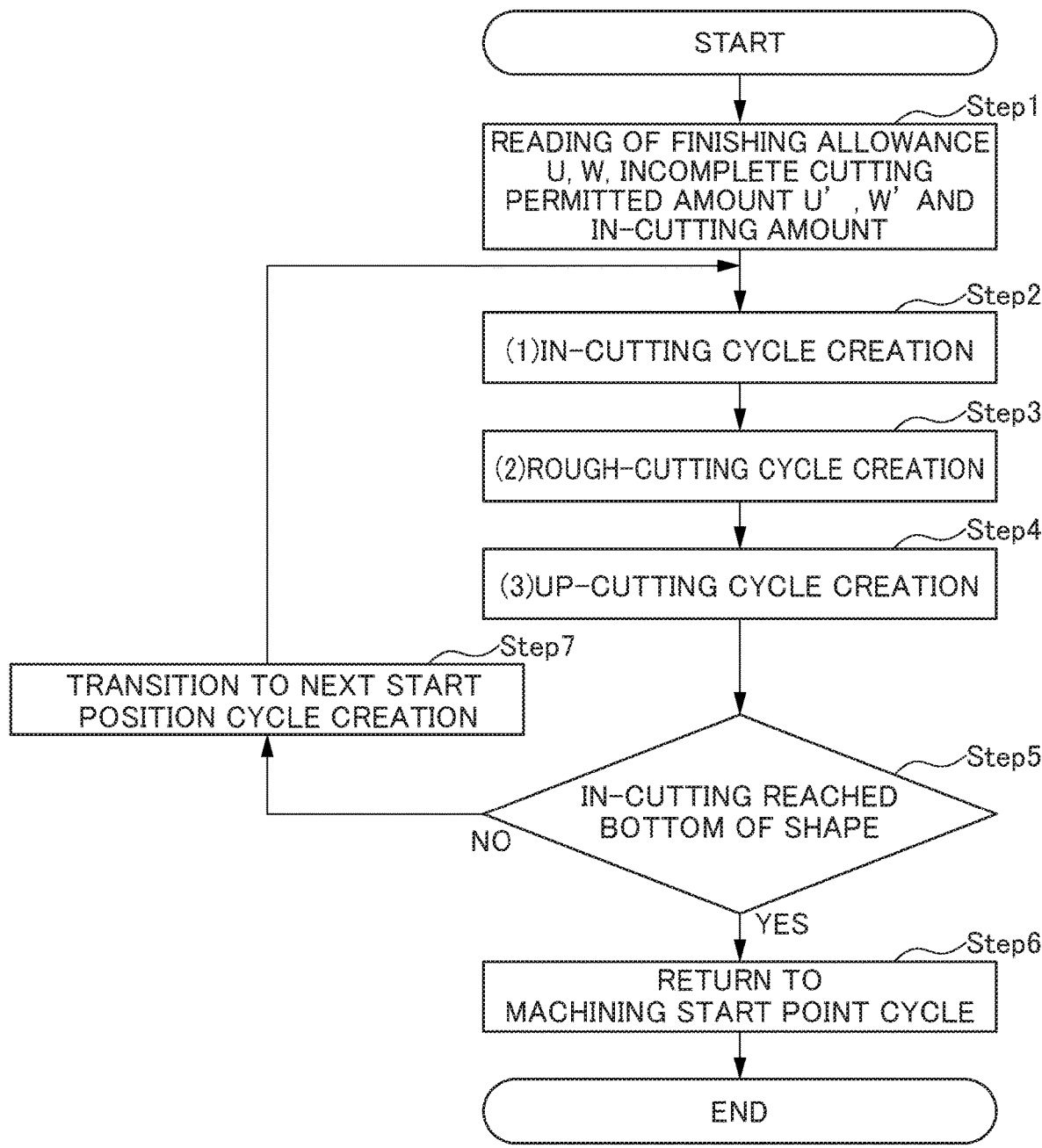
FIG. 5 is a flowchart showing a rough cutting cycle according to the embodiment of the present invention.

For example, upon using the NC device 200 for a turning process, and performing rough cutting on the workpiece 50, as shown in FIG. 5 (FIGS. 1 to 4), first, the finishing allowance U, W, incomplete cutting permitted amount U', W', and cutting depth are read from the storage unit 1 of the machining path generation device 100 (Step 1).

Next, an in-cutting cycle, rough cutting cycle and up-cutting cutting cycle (Step 2, Step 3, Step 4) are created, and cutting machining of each cycle is performed.

In the up-cutting cycle (Step 4), in the case of cutting from the cutting start point S1 of a block towards the cutting end point S2, and the in-cutting reaching the bottom of the shape (bottom of the shape in the case of leaving finishing allowance) P, a return cycle to the machining start point is started (Step 6). In the case of the in-cutting not reaching the bottom P of the shape, machining is performed of the in-cutting cycle of a next block (Step 2), rough cutting cycle (Step 3) and up-cutting cycle (Step 4), and the in-cutting cycle (Step 2), rough cutting cycle (Step 3) and up-cutting cycle (Step 4) on the next block are repeatedly performed (Step 7) in order until the in-cutting reaches the bottom P of the shape.

Figure 17:
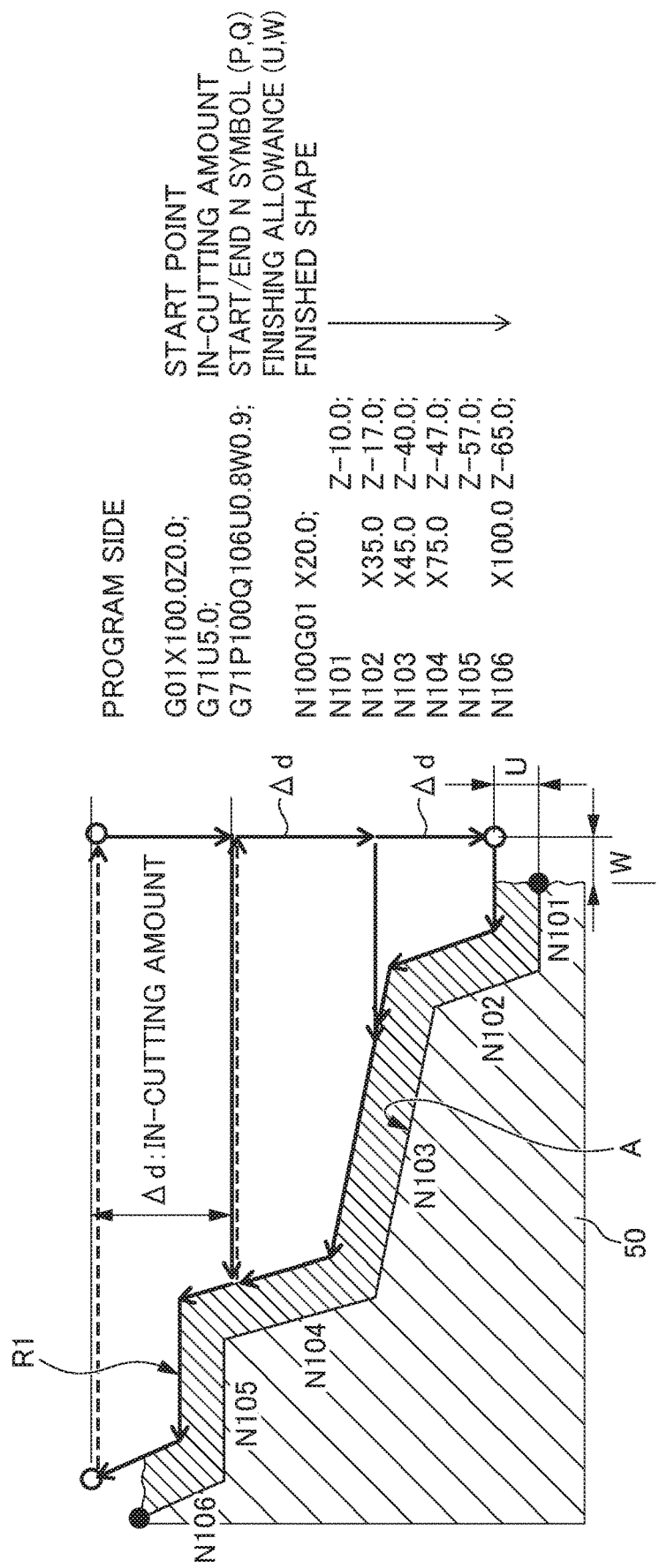
FIG. 17 is a cross-sectional view showing a cutting path during conventional rough cutting.
Figure 18:
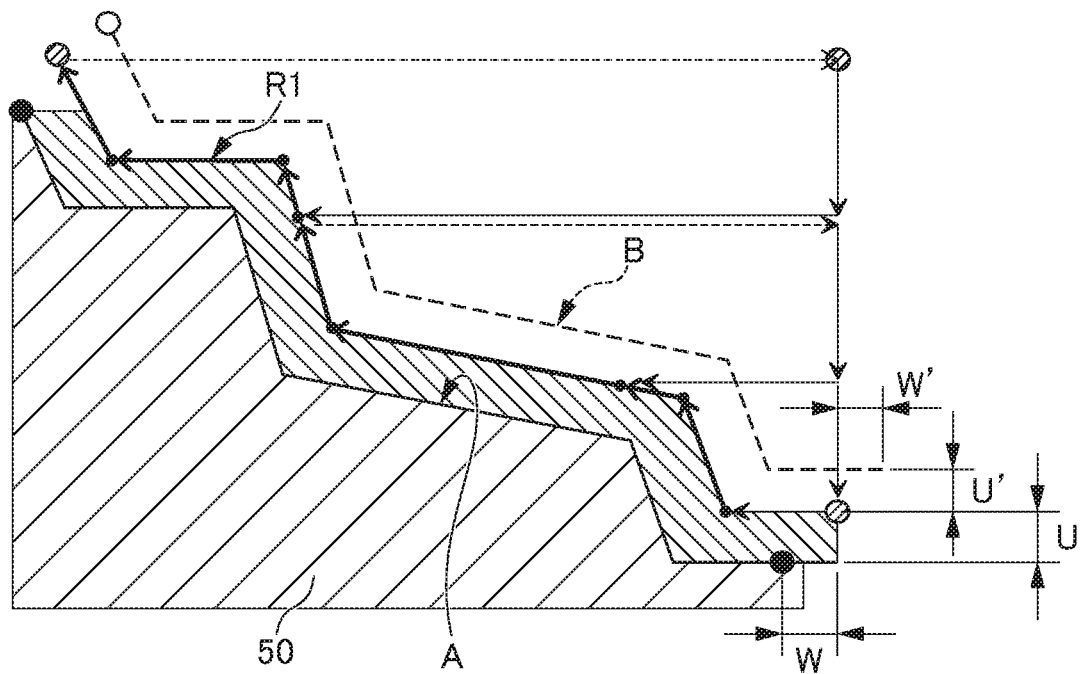
FIG. 18 is a cross-sectional view showing a cutting path during conventional rough cutting.

Herein, in the machining path generation device 100 and NC device 200 equipped with this of the present embodiment, upon creating the above-mentioned up-cutting cycle (Step 4), the cutting allowance permitted range setting unit 2 acquires from the storage unit 1 the block information from the short-cutting start point S1 until the short-cutting end point S2 (Step 8). This block information is interpolation information (G01/G02/G03 in FIG. 17), respective block end points, up-cutting start point/end points, etc.

Next, the finishing allowance permitted range H which can be permitted for appropriately performing the finishing processing of a post process is determined from information of the acquired up-cutting block (Step 9).

The finishing allowance permitted range H obtains, for example, a product form (shape A) and form (shape B)

arrived at by adding the finishing allowance (U,W) and the incomplete cutting permitted amount (U',W') to the shape A, and establishes as a range/region until shape B offset from the reference form A. More preferably, the finishing allowance permitted range H, for example, obtains a shape (shape A') made by leaving the minimum finishing allowance which can perform finishing machining appropriately on the shape A of the product form, and the shape (shape B) arrived at by adding the finishing allowance (U,W) and incomplete cutting permitted amount (U',W') to the shape A, and establishes as the range/region from the reference shape A' until an offset shape B.

In other words, the finishing allowance permitted range H sets so that it is possible to perform finishing cutting and machining suitably by keeping a desired precision, the shortened amount of the cycle time of rough cutting is greater than the increase in cycle time of finishing processing, and can lessen the cycle time combining the rough cutting and finishing processing.

Next, as shown in FIGS. 6, 7, 8 and 9 (FIGS. 1 to 4), in the cross-sectional views (cross-sectional views of FIGS. 7 and 9) in a direction along the rotation axis line of the workpiece 50, the provisional path generation unit 3 obtains a provisional path (shortest path) R3 connecting the up-cutting start point S1 and up-cutting end point S2 (Step 10).

Figure 6:
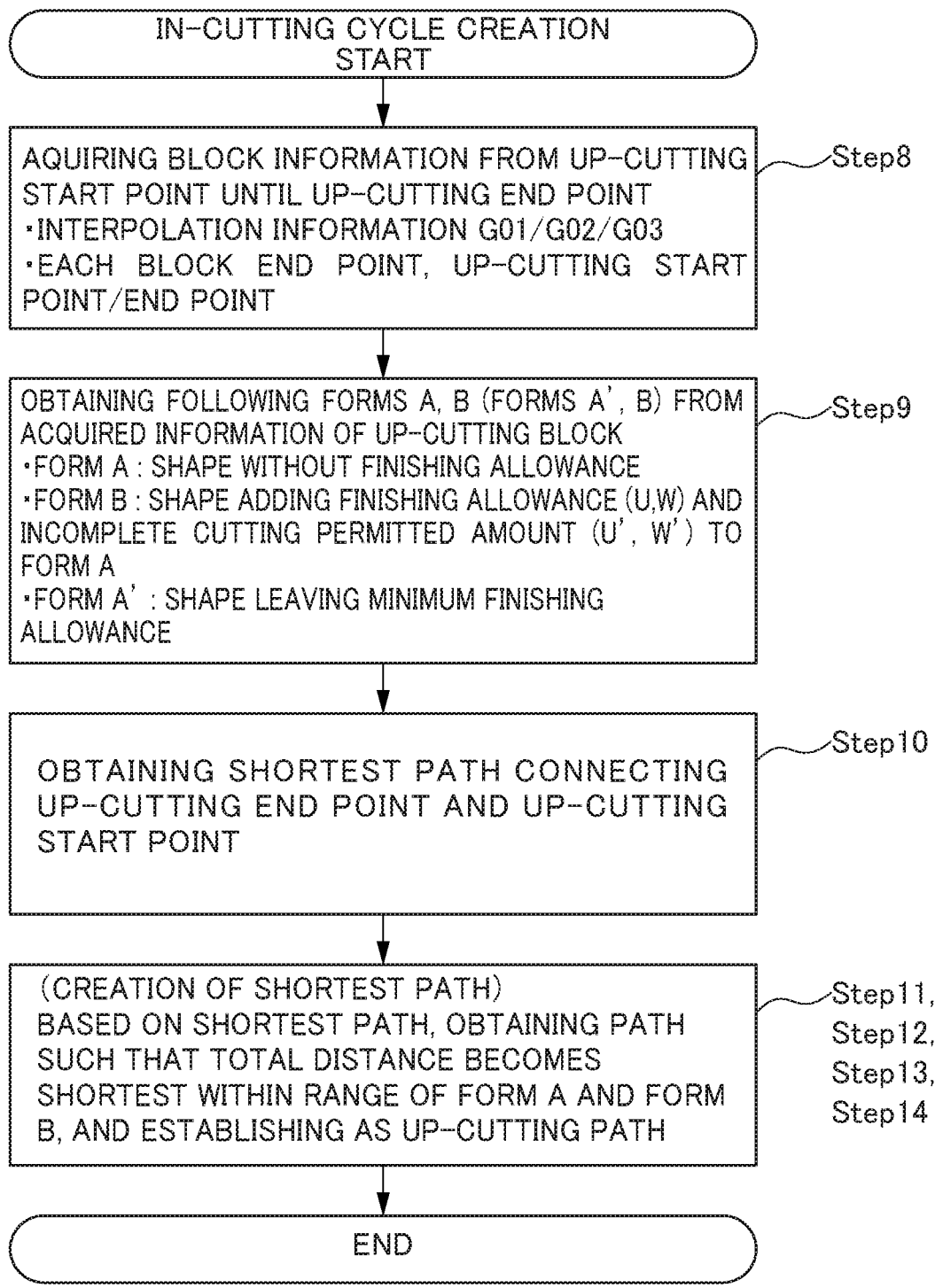
FIG. 6 is a flowchart showing a sequence of creating/generating up-cutting cycle by the machining path generation device according to the embodiment of the present invention.
Figure 8:
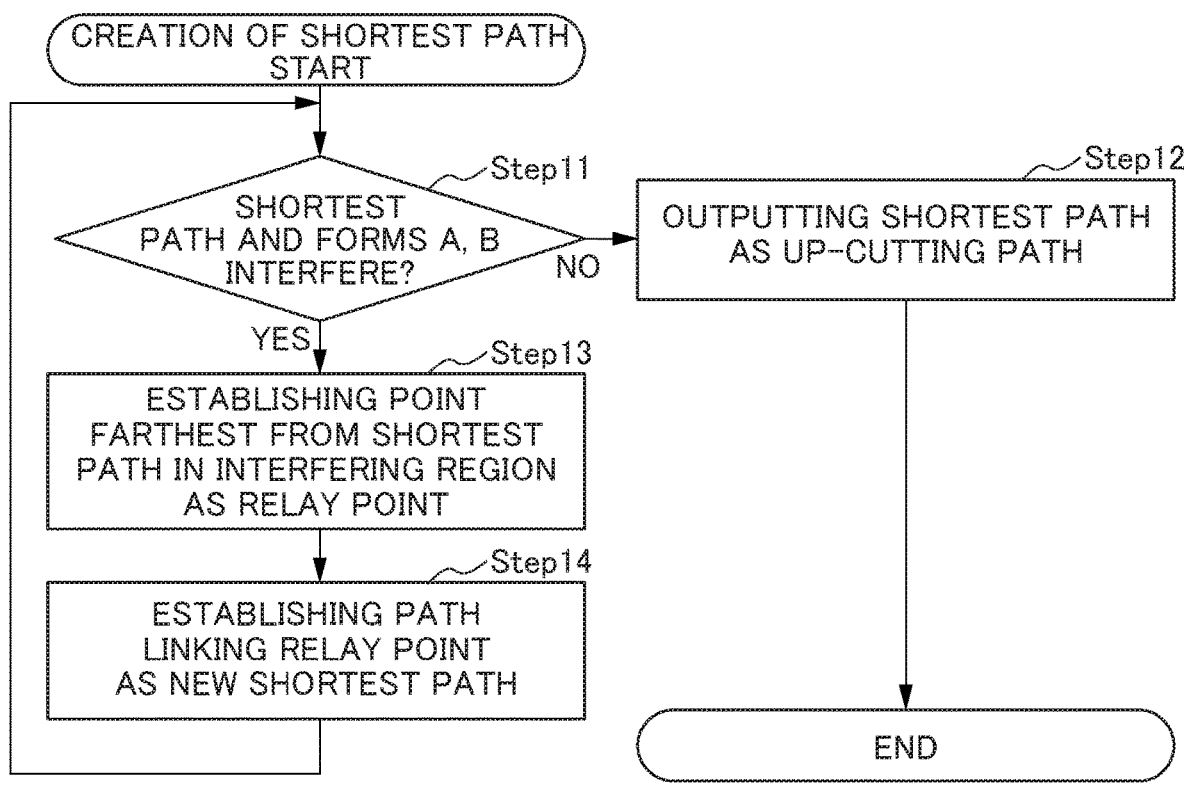
FIG. 8 is a flowchart showing a sequence of creating a cutting path by the machining path generation device according to the embodiment of the present invention.

In addition, the path interference determination part 5 of the cutting path generation unit 4 confirms whether or not the provisional path R3 and shape line of the shape B arrived at by adding the finishing allowance and incomplete cutting permitted amount will respectively interfere (FIGS. 6 and 8: Step 11). In other words, it confirms whether there is a portion/region departing from the finishing allowance permitted range H in the provisional path R3.

Figure 7:
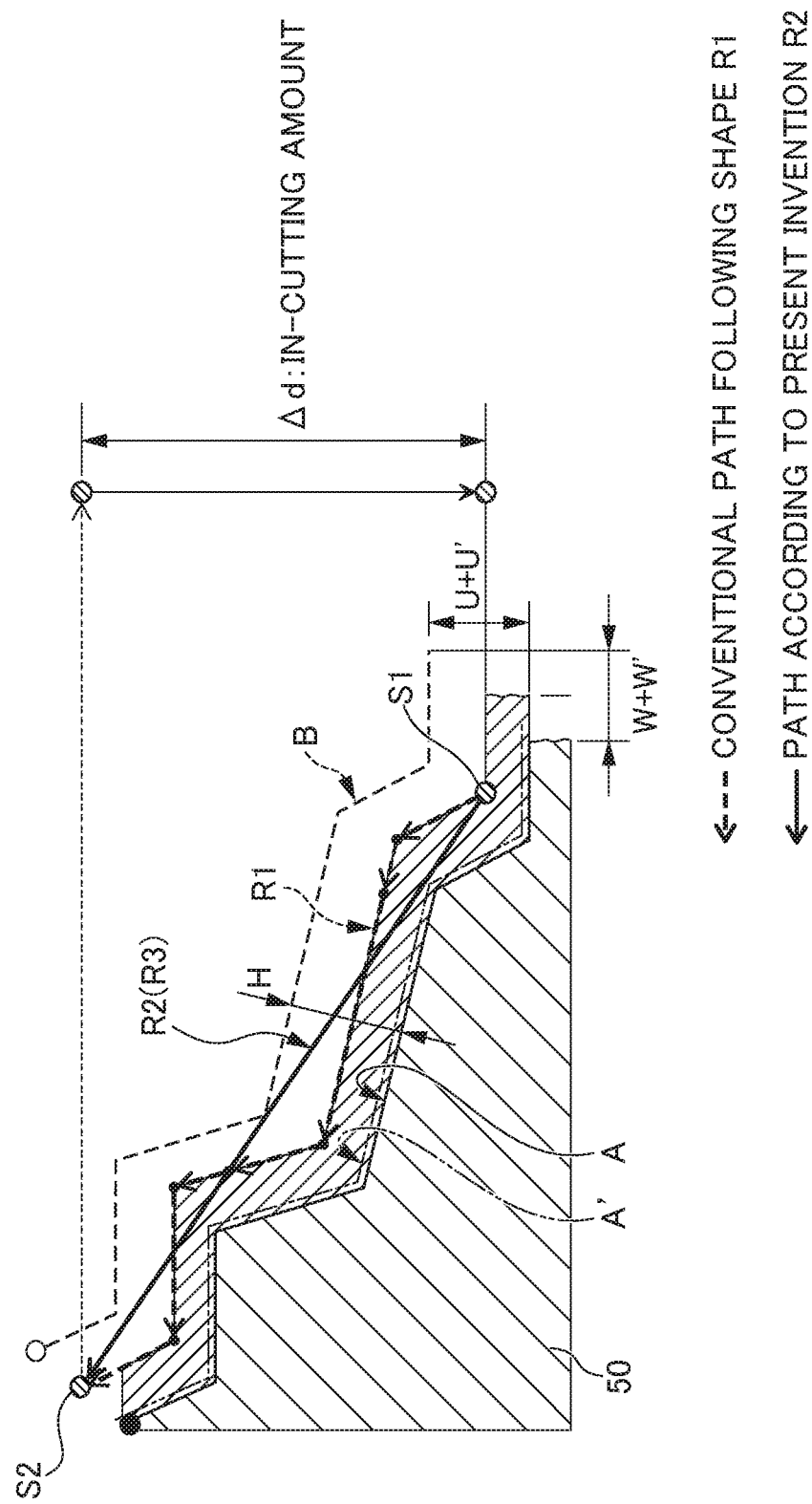
FIG. 7 is a cross-sectional view showing a cutting path during rough cutting which was set by the machining path generation device (and numerical control device including this) according to the embodiment of the present invention.

Then, as shown in FIGS. 6, 7 and 8, in the case of being determined as not interfering by the path interference determination part 5, the provisional path R3 obtained by the provisional path generation unit 3 is outputted as the cutting path (shortest path) R2 by the cutting path determination part 6 (FIGS. 6 and 8: Step 12).

Figure 9:
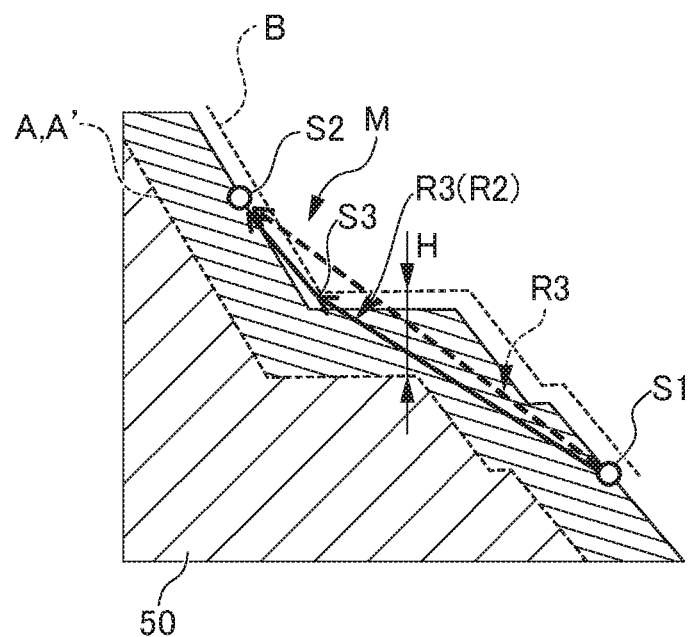
FIG. 9 is a view used in the explanation of a creation method of the cutting path in the case of a provisional-path set by the machining path generation device according to the embodiment of the present invention diverging from a finishing allowance permitted range.
Figure 10:
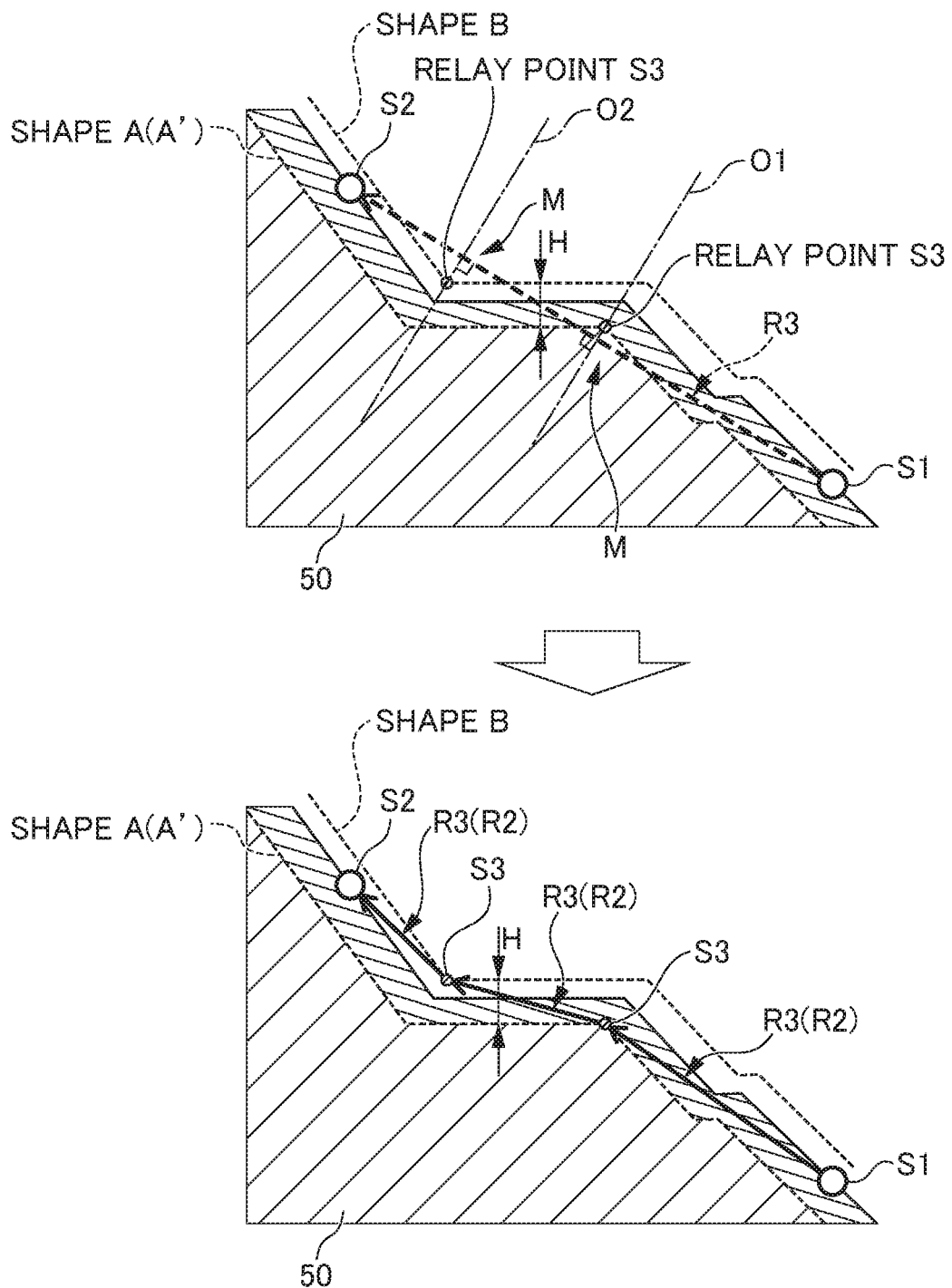
FIG. 10 is a view used in the explanation of a creation method of the cutting path in the case of a provisional-path set by the machining path generation device according to the embodiment of the present invention diverging from a finishing allowance permitted range, and is a view showing a setting method of relay points.

On the other hand, as shown in FIGS. 6, 8 and 9, in the case of the provisional path R3 and the shape A (shape A'), shape B interfering, it performs a compensation operation of the provisional path R3 (FIGS. 6 and 8: Step 13, Step 14).

In this compensation operation of the provisional path R3, first, as shown in FIGS. 3, 8, 9 and 10, in the interfering region (region M in which the provisional path R3 departs from the cutting allowance permitted range H), it obtains a point on the shape line of the shape A (shape A') at which the distance of the shape line of the shape A (shape A') to the provisional path R3 in a direction O1 orthogonal to the provisional path R3 becomes the greatest (point farthest from provisional path R3); and a point on the shape line of the shape B at which the distance of the shape line of the shape B to the provisional path in a direction O2 orthogonal to the provisional path R3 is the greatest (point farthest from the provisional path R3), and the relay point setting section 7 sets these points as the relay points S3 (Step 13).

Next, the provisional path compensation section 8 generates a new provisional path R3 connecting the cutting start point S1 and cutting end point S2 going through the relay point S3 (Step 14). The path interference determination part 5 confirms whether the shape line of the shape A (shape A'), shape line of the shape B respectively interfere with this new provisional path R3 (Step 11), and in the case of determining as there not being interference, and the new provisional path R3 falling into the finishing allowance permitted range H, the cutting path determination part 6 establishes the new provisional path R3 as the cutting path (shortest path) R2.

In addition, in the case of determining that the shape line of shape A (shape A'), shape line of shape B interfere with the new provisional path R3, and the new provisional path R3 departing from the finishing allowance permitted range H, it repeats the setting of relay points S3 again, and operation for obtaining the provisional path R3 going through the reset relay point S3 in the interfering region M, generates a provisional path R3 falling into the finishing allowance permitted range H, and establishes this as the cutting path R2 (Step 13, Step 14).

Then, in the machining path generation device 100 and NC device 200 of the present embodiment, by performing a turning process with the cutting path R2 set as mentioned above as the path of rough cutting, the cutting path R2 during rough cutting of the workpiece 50 can be made shorter than conventionally, whereby it becomes possible to shorten the cycle time. In other words, it becomes possible to optimize the in-cutting/up-cutting path of the rough cutting cycle of machine tool.

Figure 11:
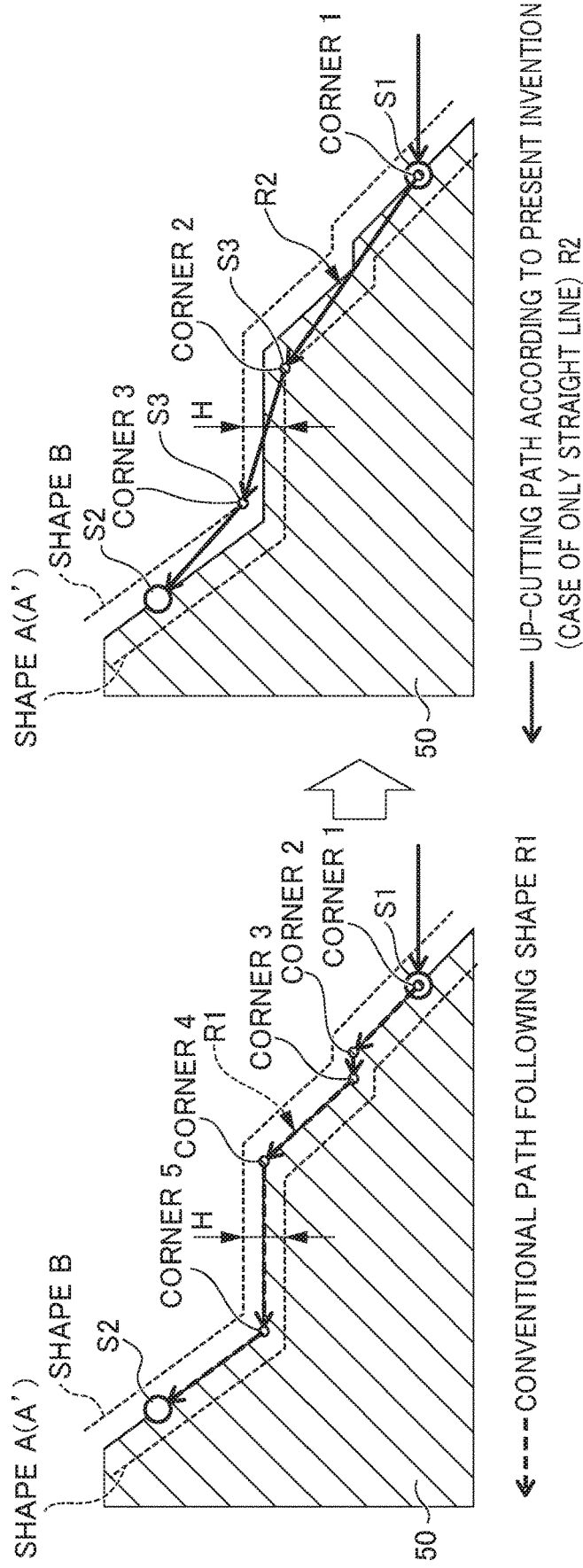
FIG. 11 is a view showing reduction effect of the number of corners in a case of setting the cutting path by the machining path generation device according to the embodiment of the present invention.

In addition, as shown in FIG. 11, it is possible to reduce the number of corners during rough cutting, in the case of machining a product having a plurality of corners, i.e. possible to reduce the locations at which performing acceleration/deceleration, and becomes possible to achieve further shortening of the cycle time.

Although an embodiment of the machining path generation device and numerical control device according to the present invention has been explained above, the present invention is not to be limited to the above-mentioned embodiment, and it is possible to modify where appropriate within a range not departing from the gist of the present invention.

Figure 12:
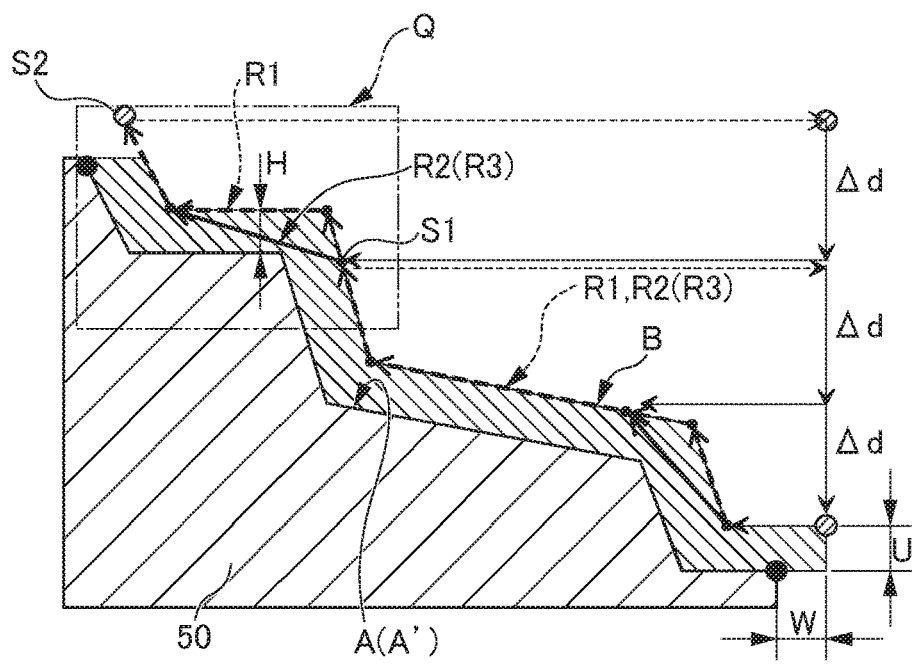
FIG. 12 is a cross-sectional view showing a modified example of a cutting path during a rough cutting machining set by the machining path generation device (and numerical control device including this) according to the embodiment of the present invention.
Figure 13:
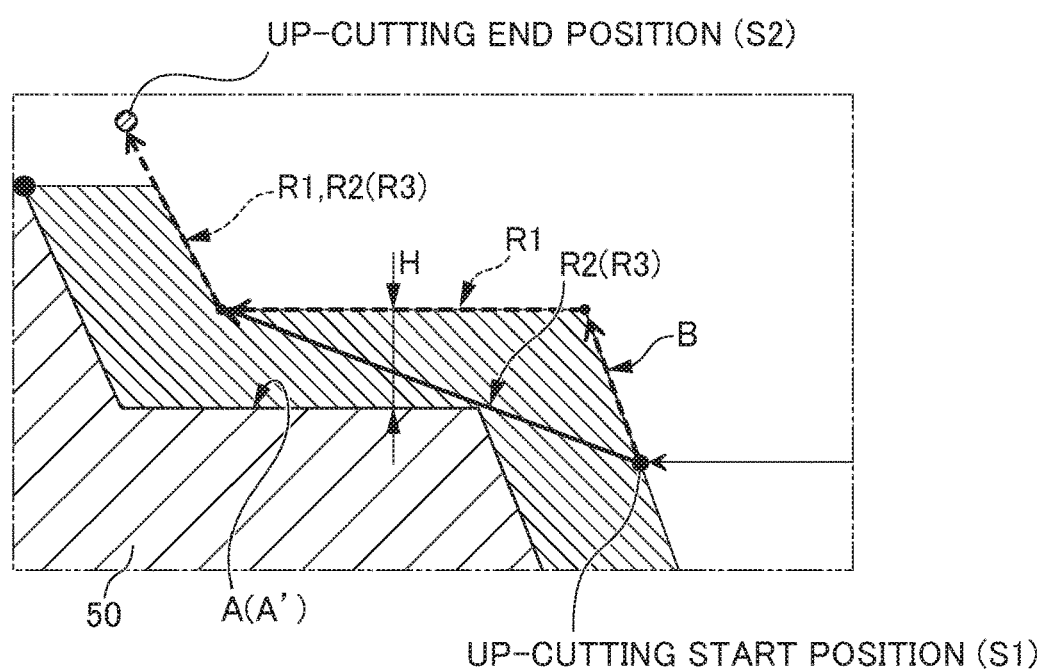
FIG. 13 is an enlarged view of a symbol Q part in FIG. 12.

For example, upon setting the provisional path R3 connecting the cutting start point S1 and cutting end point S2, as shown in FIGS. 12 and 13, it may be set so as to perform optimization of the path R3 (R2) as in the present embodiment only on a part thereof, and the other portions may be set so that the path R1 (R3) of the finishing allowance along the finished shape becomes the cutting path R2 similarly to conventional.

In addition, in the present embodiment, a portion of the relay point S3 of the cutting path R2 for rough cutting becomes a corner (elbow at which lines on both sides sandwiching the relay point S3 intersect the relay point S3 in a cross-sectional view in a direction along the rotation axis line of the workpiece 50).

In contrast, in the machining path generation device 100 of the present embodiment, as shown in FIGS. 3, 14, 15 and 16, may be configured so as to include a curving compensation unit 10, and perform curving compensation which makes a portion of the relay point S3 into a circular arc (curved shape), and generates a smoothly linking cutting path R2.

Figure 14:
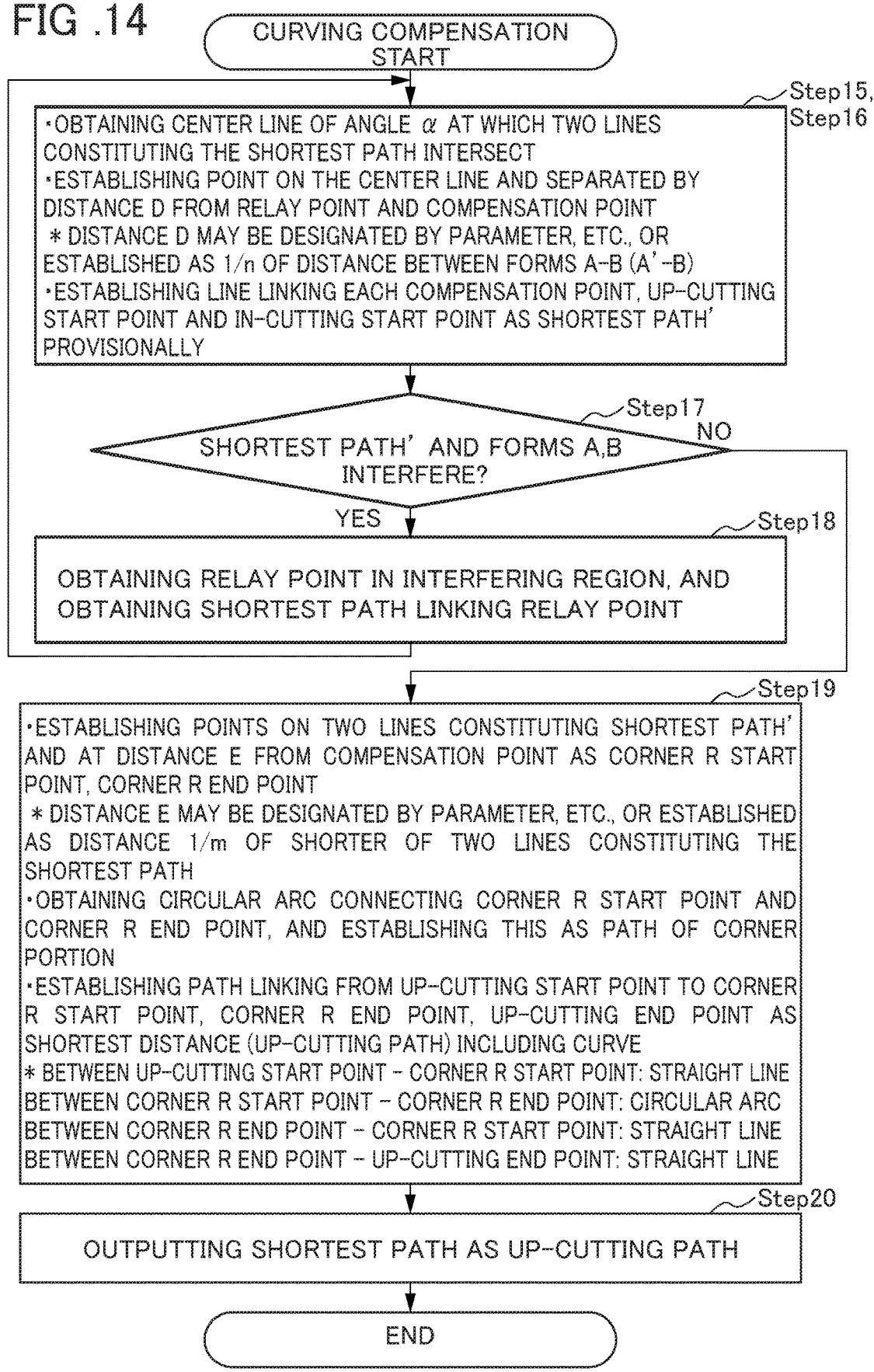
FIG. 14 is a flowchart showing a sequence of curving compensating a cutting path by the machining path generation device according to the embodiment of the present invention.
Figure 15:
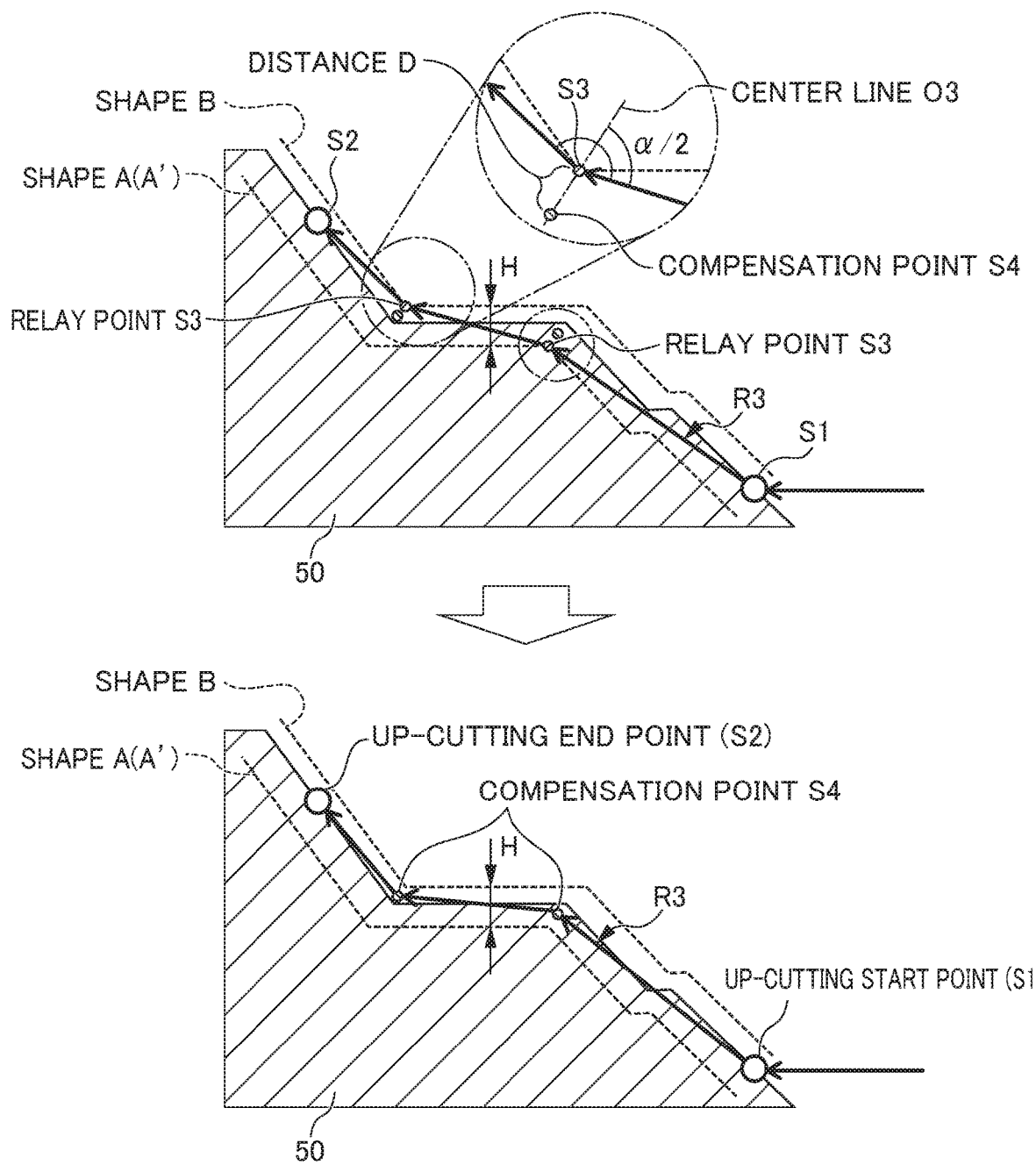
FIG. 15 is a cross-sectional view used in explanation of a method of curve compensating a cutting path by the machining path generation device according to the embodiment of the present invention.

For example, the curving compensation unit 10 obtains all relay points S3 by the above-mentioned operation of the present invention, and after generating a provisional path R3 of only a line, the centerline setting part 11 of the curving compensation unit 10 obtains a centerline O3 which divides in two an intersecting corner (intersection angle) α of two lines on both sides sandwiching the relay point S3 of the provisional path R3, as shown in FIGS. 3, 14 and 15 (Step 15).

Then, a compensation point setting part 12 of the curving compensation unit 10 sets a point on this centerline O3, separated by a distance D from the relay point S3 towards a central side of the finishing allowance permitted range H (thickness direction central side) as a compensation point S4, in a cross-sectional view in a direction along the rotation axis line of the workpiece 50, and establishes a line consisting passing through each compensation point S4 and consisting of a plurality of lines connecting the cutting start point S1 and cutting end point S2 as the provisional path (provisional shortest path) R3 (Step 16). It should be noted that the distance D, for example, may be designated as a parameter or the like, and may be arbitrarily set as 1/n of the distance between the shape A (shape A') and shape B (thickness of finishing allowance permitted range H), or the like.

Next, similarly to the present embodiment, the path interference determination part 5 confirms whether or not the provisional path R3 through the compensation points S4 and the shape line of the product form A (shape A') and shape line of the shape B arrived at by adding the finishing allowance and the incomplete cutting permitted amount interfere with each other (Step 17). In the case of the provisional path R3 interfering, similarly to the present embodiment, it obtains the relay point S3 at the interfering region M, obtains the shortest path R3 linking the relay points S3, and obtains again the compensation point S4 similarly to described above (Step 18).

On the other hand, in the case of the provisional path R3 not interfering, as shown in FIGS. 3, 14 and 16, a corner start/end point setting unit 13 sets a point separated by a distance E from the compensation point S4 on the lines on both sides sandwiching the compensation point S4 of the provisional path R3 as the corner R start point S5, corner R end point S6 (Step 19). It should be noted that the distance E may be designated as a parameter or the like, and arbitrarily set as 1/m of the shorter line on both sides sandwiching the compensation point S4, or the like.

Next, by way of an arc section setting unit 14, the circular arc contacting the corner R start point S5 and corner R end point 36 is obtained, a provisional path R3 including the circular arc (curve) is generated, and in the case of this provisional path R3 not interfering, the cutting path determination part 6 establishes the provisional path R3 including this circular arc as the cutting path R2 (Step 20). It should be noted that, at a stage of the provisional path R3 including the circular arc (curve) was generated, the presence of interference with the shape line of the shape A (shape A'), shape line of shape B is confirmed by the path interference determination part 5, and in the case of interfering, performs resetting of the distance E and compensation point S4, and configures so that the provisional path including the circular arc falls within the finishing allowance permitted range H.

By performing machining of rough cutting by this cutting path R2, it becomes possible to obtain similar effects as the above-mentioned present embodiment, and possible to perform rough cutting machining more efficiently by there not being corners, and becomes possible to achieve further shortening of the cycle time.

EXPLANATION OF REFERENCE NUMERALS 1 storage unit
2 finishing allowance permitted range setting unit
3 provisional path generation unit
4 cutting path generation unit
5 path interference determination part
6 cutting path determination part
7 relay point setting section
8 provisional path compensation section
10 curving compensation unit
11 centerline setting part
12 compensation point setting part
13 corner start/end point setting part
14 circular arc segment setting part
50 workpiece
100 machining path generation device
200 NC device
A product form (form without finishing allowance)
A' shape leaving minimum finishing allowance
B shape adding finishing allowance and incomplete cutting permitted amount
H finishing allowance permitted range
M interfering region (region in which provisional path departs from finishing allowance permitted range)
O1 direction orthogonal to provisional path
O2 direction orthogonal to provisional path
O3 center line
P bottom of shape
R1 conventional cutting path
R2 cutting path (shortest path)
R3 provisional path (shortest path)
S1 cutting start point (up-cutting start point, in-cutting start point)
S2 cutting end point (up-cutting end point, in-cutting end point)
S3 relay point
S4 compensation point
S5 corner R start point
S6 corner B end point

What is claimed is:

1. A machining path generation device for a machine tool, wherein the machine tool cuts a workpiece by a turning process according to a cutting path connecting a cutting start point and a cutting end point of rough cutting of the workpiece, the device comprising:
   a storage unit which stores information of the cutting start point and the cutting end point;
   a finishing allowance permitted range setting unit which sets a finishing allowance permitted range which can be permitted in a finishing step of post process;
   a cutting path generation unit which generates the cutting path connecting the cutting start point and the cutting end point in a cross-sectional view in a direction along a rotation axis line of the workpiece, so as to be arranged within the finishing allowance permitted range, and connect the cutting start point and the cutting end point to be shorter than a path following along a shape line of a product form; and
   a provisional path generation unit which obtains a provisional path of a line connecting the cutting start point and the cutting end point, the line consisting of one or more straight line segments;
   wherein the cutting path generation unit, when the provisional path departs from the finishing allowance permitted range, generates the cutting path by compensating for the provisional path of a region departing from the finishing allowance permitted range so that the cutting path is within the finishing allowance permitted range;
   wherein the cutting path generation unit includes a path interference determination part which confirms whether or not the provisional path interferes with a shape line of an offset shape arrived at by adding the finishing allowance and an incomplete cutting permitted amount to the shape line of the product form, in a cross-sectional view in a direction along the rotation axis line of the workpiece, and a cutting path determination part;

wherein the shape line of the offset shape is disposed farther away from the rotation axis line of the workpiece than the shape line of the product form; and wherein the cutting path determination part includes:
  a relay point setting section which, in a case where the path interference determination part determines that the provisional path is interfering with the shape line of the offset shape, obtains a point farthest from the provisional path in the interfering region, and establishes this point as a relay point, and
  a provisional path compensation section which generates a new provisional path connecting the cutting start point and the cutting end point through the relay point; and wherein the cutting path determination part repeats setting of the relay point and generation of the new provisional path until the provisional path falls within the finishing allowance permitted range, and establishes a provisional path falling within the finishing allowance permitted range as the cutting path.

2. The machining path generation device according to claim 1,
  wherein the cutting path determination part establishes the provisional path as the cutting path, in a case where the path interference determination section determines the provisional path is not interfering.

3. The machining path generation device according to claim 2, further comprising a curving compensation unit for generating the cutting path which establishes into a circular arc shape and smoothly connects a portion of the relay point.

4. A numerical control device comprising the machining path generation device according to claim 1.

5. A numerical control device comprising the machining path generation device according to claim 2.

6. A numerical control device comprising the machining path generation device according to claim 3.

* * * * *